United States Patent
Taylor et al.

(10) Patent No.: US 7,792,921 B2
(45) Date of Patent: Sep. 7, 2010

(54) METADATA ENDPOINT FOR A GENERIC SERVICE

(75) Inventors: John A. Taylor, Bellevue, WA (US);
Andrew L. Luty, Redmond, WA (US);
David L. Stucki, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 11/903,567

(22) Filed: Sep. 24, 2007

(65) Prior Publication Data

US 2009/0083296 A1    Mar. 26, 2009

(51) Int. Cl.
*G06F 15/16* (2006.01)
*G06F 15/177* (2006.01)
*G06F 7/00* (2006.01)

(52) U.S. Cl. .................. 709/217; 709/232; 709/223; 707/602

(58) Field of Classification Search .................. 709/223, 709/224
See application file for complete search history.

(56) References Cited

U.S. PATENT DOCUMENTS

| | | | |
|---|---|---|---|
| 6,973,460 B1 * | 12/2005 | Mitra | 707/103 R |
| 7,047,243 B2 | 5/2006 | Cabrera et al. | |
| 7,072,967 B1 | 7/2006 | Saulpaugh et al. | |
| 7,152,090 B2 | 12/2006 | Amirisetty et al. | |
| 7,159,224 B2 | 1/2007 | Sharma et al. | |
| 7,162,687 B2 | 1/2007 | Pelegri-Llopart et al. | |
| 2005/0234969 A1 | 10/2005 | Mamou et al. | |
| 2006/0041647 A1 | 2/2006 | Perham et al. | |
| 2006/0174016 A1 | 8/2006 | Critchley et al. | |
| 2007/0011605 A1 | 1/2007 | Dumitru et al. | |
| 2008/0288547 A1 * | 11/2008 | Brodsky et al. | 707/200 |

OTHER PUBLICATIONS

Olsen, et al., "Prototype for a IEC 61400-25 Compliant Generic Server", Date: 2006, pp. 1-156.

* cited by examiner

*Primary Examiner*—Joseph E Avellino
*Assistant Examiner*—Harunur Rashid

(57) ABSTRACT

A system and method for creating a metadata endpoint for a generic data service provided by a first Service Oriented Environment (SOE) is disclosed. The first SOE is an SOE in which a process that hosts the runtime environment of the data service normally exposes a data endpoint for the data service but does not normally expose a metadata endpoint for the data service. In accordance with one embodiment, the metadata endpoint is created as part of a separate process than the process that exposes the data endpoint. The system and method advantageously enables the data service of the first SOE to be utilized by data services in a second SOE in which both a data endpoint and a metadata endpoint are normally exposed for a data service.

15 Claims, 6 Drawing Sheets

500

START
↓
RECEIVING A REQUEST FOR METADATA OF A DATA ENDPOINT OPERATING ON A FIRST PROCESS.
510
↓
RETRIEVING METADATA CORRESPONDING TO THE DATA ENDPOINT FROM A METADATA ENDPOINT OPERATING ON A SECOND PROCESS.
520
↓
CREATING A REPLY WHICH CONVEYS THE METADATA AND THE LOCATION OF THE DATA ENDPOINT.
530
↓
END

```
                    START
                      |
                      v
┌─────────────────────────────────────────────────┐
│ DEFINING AN ENDPOINT FOR METADATA WHICH WAS     │
│ PREVIOUSLY COMBINED WITH A CORRESPONDING DATA   │
│ ENDPOINT OF A FIRST SERVICE ORIENTED            │
│ ENVIRONMENT (SOE) IN WHICH A COMBINING          │
│ CONSTRAINT IS NOT PLACED UPON METADATA AND      │
│ CORRESPONDING DATA                              │
│ 610                                             │
└─────────────────────────────────────────────────┘
                      |
                      v
┌─────────────────────────────────────────────────┐
│ PUBLISHING A LOCATION FOR ACCESSING THE ENDPOINT│
│ FOR METADATA FOR USE BY A SECOND SOE WHEREIN A  │
│ COMBINING CONSTRAINT IS PLACED UPON METADATA AND│
│ CORRESPONDING DATA                              │
│ 620                                             │
└─────────────────────────────────────────────────┘
                      |
                      v
                     END
```

FIG. 6

METADATA ENDPOINT FOR A GENERIC SERVICE

BACKGROUND

Service Oriented Architecture (SOA) refers to an evolving technology which is increasingly implemented for building distributed computing systems. A service in the context of an SOA is typically defined as a functionality which is exposed to other nodes. A typical SOA collects discreet services into a single logical application. In other words, the services can be implemented as building blocks to form an ad-hoc application from existing software applications. In some SOAs, the services can be local or remote and a single node in an SOA can act as both a client and as a service for another client.

Typically, an SOA is implemented using Web Services which facilitate accessing a local application via the Internet. In other words, Web Services allow the exchange of data between different services of an SOA. Using Web Services, a data service can publish the function of an application to other nodes of the SOA by sending a message which describes the location of a service and the functionality performed by that service. Typically, a service is called when a message invoking the operation is received. For example, the message may specify a given operation in the message header.

However, there are a variety of discrete applications which can be described as separate Service Oriented Environments (SOEs). These various SOEs may further utilize communication systems which differ in how they exchange data. When integrating various communication systems into an SOA, the differences in how they operate can hinder integrating those platforms

SUMMARY

This Summary is provided to introduce a selection of concepts that are further described below in the Detailed Description. This Summary is not intended to be used as an aid in determining the scope of the claimed subject matter.

A metadata endpoint for a generic service is disclosed. The technology initially defines an endpoint for metadata which was previously combined with a corresponding data endpoint. The metadata and corresponding data endpoint were combined in a first Service Oriented Environment (SOE) in which a combining constraint is not placed upon metadata and corresponding data endpoints. A location for accessing the endpoint for metadata is published for use by a second SOE in which a combining constraint is placed upon metadata and corresponding data.

Furthermore, the present technology separates the design time metadata from the runtime environment. In one embodiment, the metadata endpoint is associated with a disabled clone of the data endpoint of the service. Schema describing the data endpoint is stored in another location associated with the corresponding metadata endpoint. In one embodiment, the data endpoint and the disabled clone of the data endpoint are running from two separate processes and either of them can be initiated or disabled independently. In other words, metadata for a generic endpoint is served from a different process than that of the data endpoint. As a result, a developer can access the metadata to create an application which can communicate with the data endpoint and in a manner which keeps the design time experience separate from the runtime of the service.

DESCRIPTION OF THE DRAWINGS

The accompanying drawings, which are incorporated in and form a part of this specification, illustrate embodiments of the technology for a metadata endpoint for a generic service and, together with the description, serve to explain principles discussed below:

FIG. 5 is a flowchart of a computer-implemented method for exchanging metadata in accordance with one embodiment of the present technology.

FIG. 6 is a flowchart of a computer-implemented method for creating a metadata endpoint for a generic service in accordance with one embodiment of the present technology.

DETAILED DESCRIPTION

Reference will now be made in detail to embodiments of the present technology for a metadata endpoint for a generic service, examples of which are illustrated in the accompanying drawings. While the technology for a metadata endpoint for a generic service will be described in conjunction with various embodiments, it will be understood that they are not intended to limit the present technology for a metadata endpoint for a generic service to these embodiments. On the contrary, the presented technology for a metadata endpoint for a generic service is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for a metadata endpoint for a generic service. However, the present technology for a metadata endpoint for a generic service may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "defining", "publishing", "creating", "disabling", "associating", "changing", "updating", "including," "receiving," "accessing," "returning" or the like, refer to the actions and processes of a computer system, or similar electronic computing device. The computer system, or similar electronic computing device, manipulates and transforms data represented as physical (electronic) quantities within the computer system's registers and memories into other data similarly represented as physical quantities within the computer system memories or registers or other such information storage, transmission, or display devices. The present technology for a metadata endpoint for a generic service is also well suited to the use of other computer systems such as, for example, optical and mechanical computers. Additionally, it should be understood that in embodiments of the present technology for a metadata endpoint for a generic service, one or more of the steps can be performed manually.

Example Computer System Environment

Figure 1:
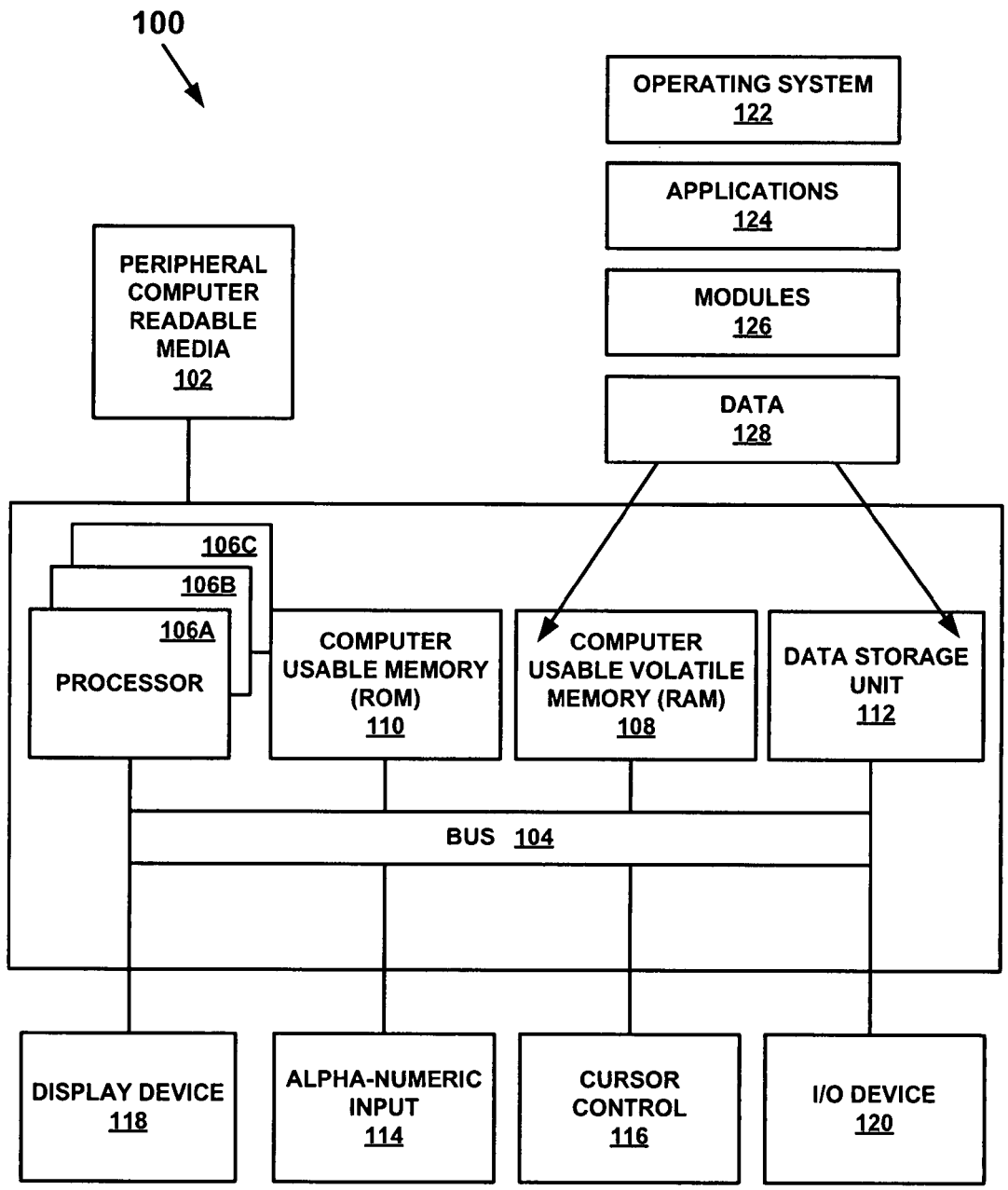
FIG. 1 is a diagram of an exemplary computer system used in accordance with embodiments of the present technology for a metadata endpoint for a generic service.

With reference now to FIG. 1, portions of the technology for a metadata endpoint for a generic service are composed of computer-readable and computer-executable instructions that reside, for example, in computer-usable media of a computer system. That is, FIG. 1 illustrates one example of a type of computer that can be used to implement embodiments, which are discussed below, of the present technology for a metadata endpoint for a generic service.

FIG. 1 illustrates an exemplary computer system 100 used in accordance with embodiments of the present technology for a metadata endpoint for a generic service. It is appreciated that system 100 of FIG. 1 is exemplary only and that the present technology for a metadata endpoint for a generic service can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, such as random access memory (RAM), coupled to bus 104 for storing information and instructions for processors 106A, 106B, and 106C.

System 100 also includes computer usable non-volatile memory 110, such as read only memory (ROM), coupled to bus 104 for storing static information and instructions for processors 106A, 106B, and 106C. Also present in system 100 is a data storage unit 112 (for example, a magnetic or optical disk and disk drive) coupled to bus 104 for storing information and instructions. System 100 also includes an optional alphanumeric input device 114 coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or keys on alpha-numeric input device 114 capable of signaling movement of a given direction or manner of displacement.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for a metadata endpoint for a generic service is found below.

Referring still to FIG. 1, various other components are depicted for system 100. Specifically, when present, an operating system 122, applications 124, modules 126, and data 128 are shown as typically residing in one or some combination of computer usable volatile memory 108, and data storage unit 112. In one embodiment, the present technology for dynamically mapping an action of a message, for example, is stored as an application 124 or module 126 in RAM memory locations within computer usable volatile memory 108 and memory areas within data storage unit 112.

The computing system 100 is only one example of a suitable computing environment and is not intended to suggest any limitation as to the scope of use or functionality of the present technology. However the above description is not meant to limit implementation of the present technology to a particular combination of components illustrated in the exemplary computing system 100.

The present technology is operational with numerous other general-purpose or other computer environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Overview

In general, the present technology facilitates creating a metadata endpoint for a generic data service. This facilitates implementing Service Oriented Architectures (SOAs) between SOEs which use different communication systems. In one embodiment, an SOE comprises a data service that implements a first data endpoint. The technology publishes a metadata service that implements a cloned data endpoint that is configured such that a request for a service cannot be performed by the cloned endpoint. The metadata service also implements a metadata endpoint that provides metadata describing the first data endpoint.

In one embodiment, a metadata exchange request to the metadata service is received and metadata corresponding to a generic data endpoint is retrieved by the metadata endpoint. Contract information, which describes at least one operation of the data service, is retrieved from a directory that corresponds to the metadata endpoint. In one embodiment, a pointer to the actual address or location of the first data endpoint is included in the reply to the metadata exchange request.

In so doing, the developer can create an application for a communication system in which a combining constraint is placed upon data and corresponding metadata such that it can communicate with a second communication system in which data and metadata are typically handled separately. For example, the developer can then access metadata from the metadata endpoint and access the runtime of a generic data service. The developer can then generate artifacts which are used to create an application permitting communication between the two communication systems.

It is noted that the above description is not intended to imply a specific sequence of events for creating a metadata endpoint for a generic service in accordance with embodiments of the present technology. For example, in one embodiment, the data endpoint can also be disabled if the data service is not intended to be available yet. However, the metadata endpoint can still be accessible and published for use in developing an SOA.

Figure 2:
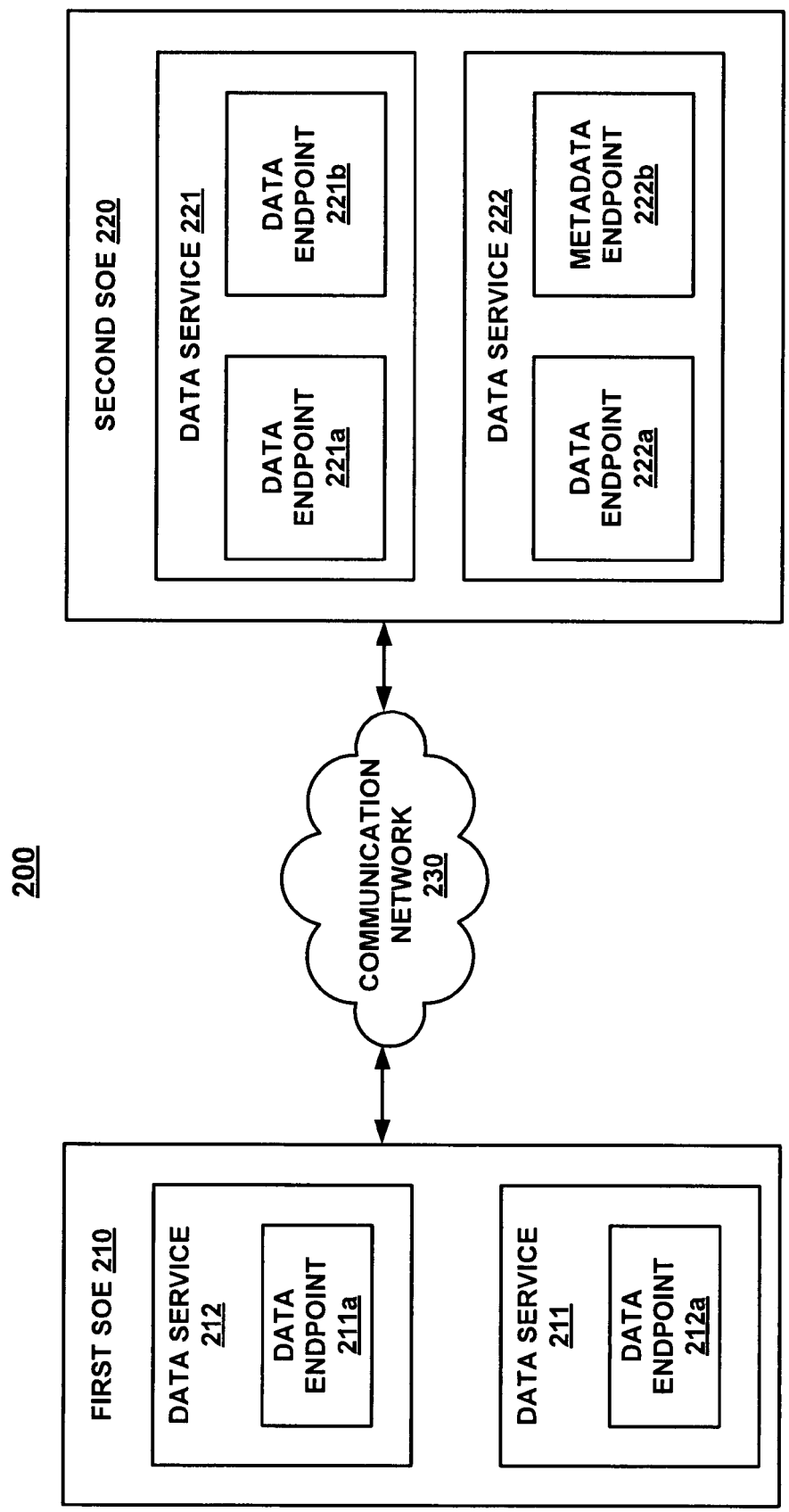
FIG. 2 is a block diagram of an exemplary SOA in accordance with one embodiment of the present technology.

FIG. 2 is a block diagram of an exemplary SOA in accordance with one embodiment of the present technology. In FIG. 2, a first SOE 210 is communicatively coupled with a second SOE 220 via a communication network 230 to form an SOA 200. In one embodiment, communication network 230 comprises, but is not limited to, the Internet.

In one embodiment, first SOE 210 is generally described as an application server architecture which handles data and corresponding metadata separately. In other words, there is no combining constraint on the service data and the corresponding service metadata in first SOE 210. Additionally, each receive location is regarded as an independent entity in which each receive location may send generic runtime data and instead utilize schema to invoke the service. For example, in one embodiment each data service (e.g., 211 and 212) within first SOE 210 comprises a data endpoint (e.g., 211a and 212a respectively) which is considered an independent entity. Thus, first SOE 210 does not describe a data endpoint, and more particularly, the runtime environment of the data endpoint, using a metadata endpoint. It is noted that the application server architecture of first SOE 210 can be implemented by computer system 100. Metadata is typically generated when a data service within first SOE 210 is created and exposes a generic runtime of the data service (e.g., 211). However, the metadata is represented as part of the message schema itself and is generated from a separate process than the process that hosts the runtime of the data service. In one embodiment, in order to access changes in the data service runtime, a metadata exchange is requested.

In contrast, second SOE 220 utilizes a communication system in which each data service can act as both a client and as a server to another client. Clients are described as applications which initiate communications with another data service which, in turn, responds to the message sent by the client. Messages are sent between data services which either send or receive messages, or both. The data services provide a description of a destination for the messages, their formatting, and how they can be sent. In one embodiment, a data service exposes at least one data endpoint and corresponding metadata describing how to communicate with the endpoint. A client can then be created which is compatible with one of the data service's data endpoints.

In general, data services within second SOE 220 handle data and corresponding metadata concurrently in contrast to first SOE 210. In one embodiment, each data service of second SOE 220 (e.g., 221 and 222) comprises a data endpoint (e.g., 221a and 222a respectively) and a corresponding metadata endpoint (e.g., 221b and 222b respectively). The metadata describes the characteristics of a data service such as data endpoints, contracts, bindings, messages, run-time data, and operations. Using the metadata, a client can be created which is able to exchange messages with the data service. Additionally, the client is able to create a message which specifically describes what action of the data service is being requested by the client. In one embodiment, the metadata is served from the same process that hosts the runtime of the data service. When data is exchanged between data services 221 and 222, the data from data endpoint 221a is combined with the metadata from metadata endpoint 221b and sent to data service 222. In other words, there is a combining constraint placed upon data and corresponding metadata within second SOE 220.

In one embodiment, second SOE 220 uses metadata to generate a proxy for each endpoint which is interacting with a service. The proxy then forwards a call to the data endpoint of the data service. As described above, a developer working within the environment of second SOE 220 may want to create an application which facilitates second SOE 220 communicating with first SOE 210. Thus, it is desired that the runtime of a data service in first SOE 210 be made available so that the developer can access the metadata which would be used to generate the proxy. However, because data services in first SOE 210 generate a generic runtime which is separate from the metadata when the data service is first created, the developer may not have access to runtime data useful in running the metadata.

Figure 3:
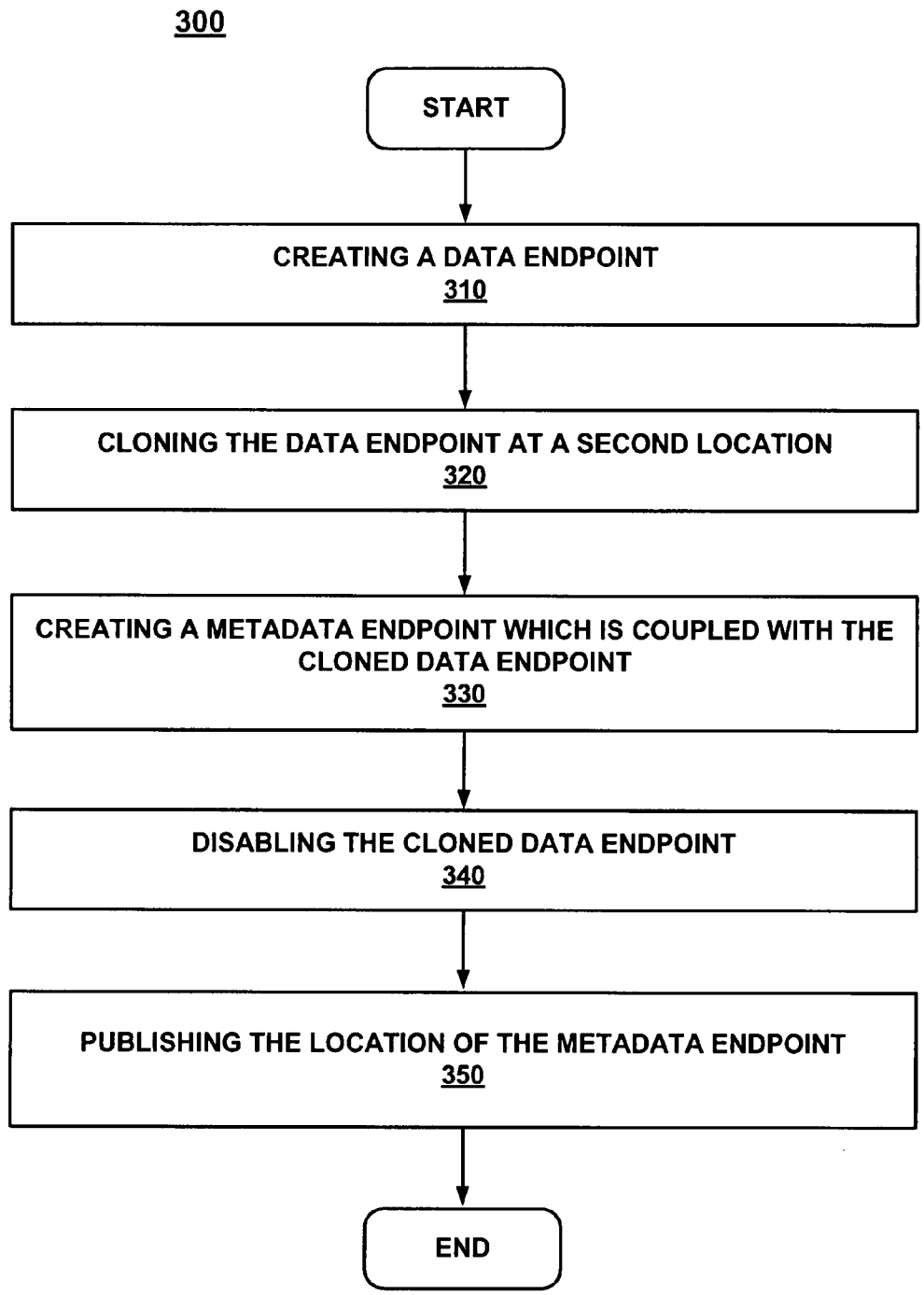
FIG. 3 is a flowchart for creating a metadata endpoint for a generic service in accordance with one embodiment of the present technology.

FIG. 3 is a flowchart of a method 300 for creating a metadata endpoint for a generic service in accordance with one embodiment of the present technology. In one embodiment, method 300 is implemented by computer system 100 as software instructions, computer firmware, a hardware interface, or a combination thereof.

Figure 4:
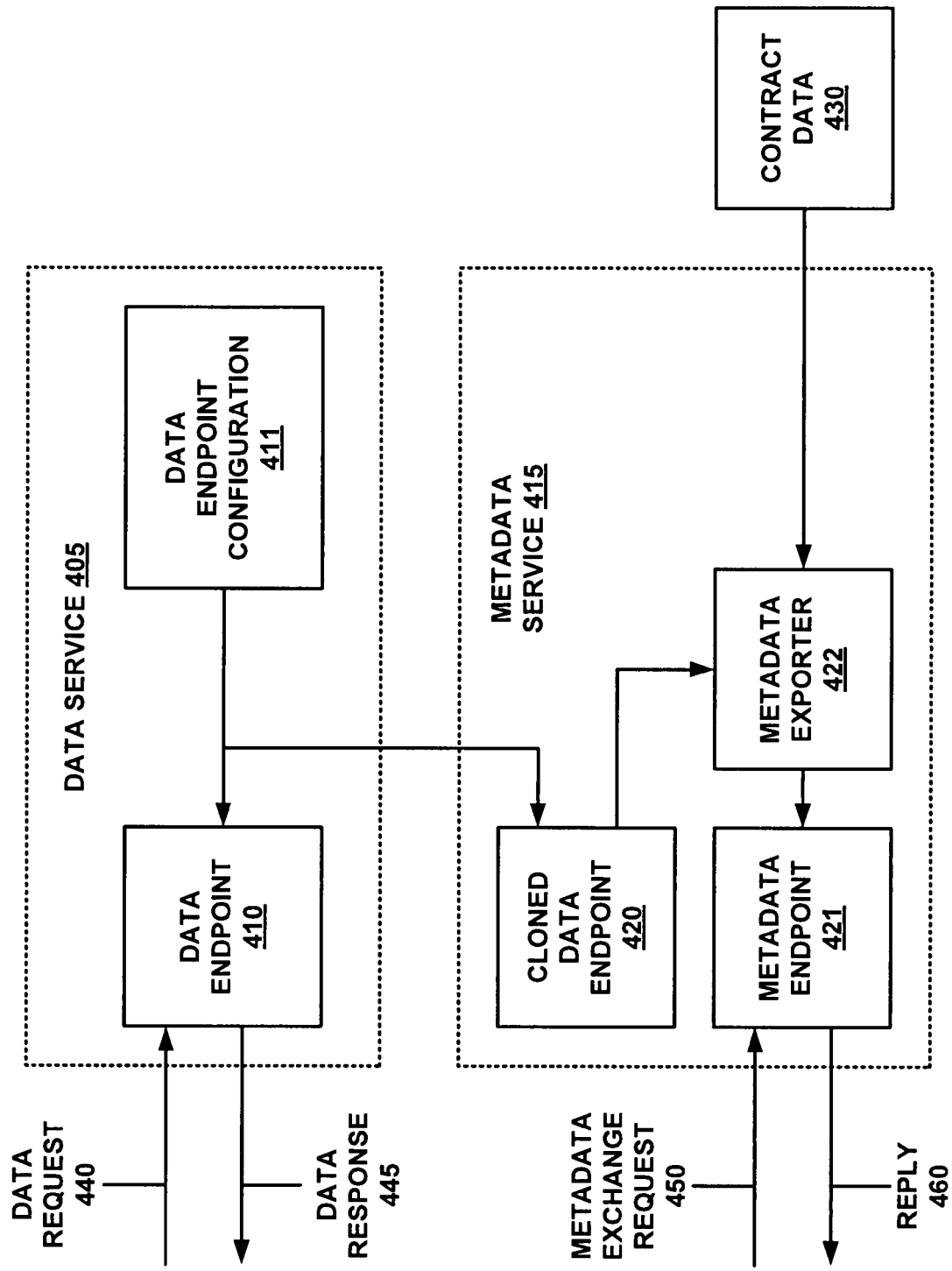
FIG. 4 is a block diagram of components used to create a metadata endpoint for a generic service in accordance with one embodiment of the present technology.

In operation 310 of FIG. 3, a data endpoint is created. Referring now to FIG. 4, a data endpoint 410 is created which is an endpoint of a data service 405 operating in first SOE 210. Because data endpoint 410 is created to be compliant with first SOE 210, there is no combining constraint on the service data and the corresponding service metadata at data endpoint 410. In one embodiment, data endpoint 410 is configured to expose binding information used to describe how to communicate with data endpoint 410 and generic contract. As described above, first SOE 210 utilizes schema to invoke an operation performed by data service 405. As a result, the generic contract exposed by data endpoint 410 does not provide enough information for a developer working within the environment of second SOE 220 to create an application which can invoke an operation of data service 405. In one embodiment, data endpoint 410 can be disabled if it is not desired to make data service 405 available at present. In other words, data service 405 may be created in advance of the time when it is intended to be made available to other nodes of first SOE 210 and/or second SOE 220.

In operation 320 of FIG. 3, the service endpoint is cloned at a second location. In one embodiment, a second service endpoint 420 is created and runs as a second process of, for example, computer system 100. In other words, second service endpoint 420 runs in a memory space that is different from service endpoint 410. However, second service endpoint 420 has the same configuration as service endpoint 410. In one embodiment, second service endpoint 420 comprises a component of a communication adapter 402 and exposes a generic service contract to second SOE 220 in order to be able to receive essentially any type of message used in the communication system of second SOE 220. Additionally, changes to the configuration of service endpoint 410 are also applied to second service endpoint 420 automatically. One advantage of running service endpoint 410 and second service endpoint 420 as separate processes is that they can be stopped and started independently from one another. In the embodiment of FIG. 4, second service endpoint 420 comprises a service endpoint resident within a communication adapter 402. Thus, second service endpoint 420 is accessed by nodes of second SOE 220 which are trying to access the operation performed by service endpoint 410.

In operation 330 of FIG. 3, a metadata endpoint is created which is coupled with the cloned data endpoint. In one embodiment, a metadata endpoint (e.g., 421) is created and is coupled with cloned data endpoint 420. Metadata endpoint 421 and cloned data endpoint 420 comprise components of a metadata service 415 which is used to provide metadata of data endpoint 410.

In one embodiment, contract data (e.g., contract data 430) which more specifically describes the operation performed by data service 405, and how to invoke that operation, is stored separately (e.g., in a separate database, memory device, or networked data storage device) from metadata service 415. Alternatively, contract data 430 may be stored locally within metadata service 415. Using contract data 430, the present technology facilitates exposing a specific, or "typed", contract in place of the generic contract that would typically be exposed by data endpoint 410 alone. As a result, a developer in, for example, second SOE 220 can now create a client which is able to invoke an operation performed by data service 405.

As a result, when a node from second SOE 220 attempts to access the metadata of data endpoint 410, the corresponding metadata is accessed via metadata endpoint 421. The data endpoint configuration 411 and the corresponding metadata (e.g., contract data 430) can then accessed by metadata exporter 422 which replaces the generic contract data from data endpoint configuration 411 with contract data 430. Thus, in response to a metadata exchange message 460, metadata service 415 returns a reply 460 comprising the binding data from data endpoint configuration 411 and the contract data 430 in a single message which is compliant with the communication system used by second SOE 220. In other words, a fully typed response is returned by the present technology rather than a generic response.

In operation 340 of FIG. 3, the cloned data endpoint is disabled. In one embodiment, the transport layer of cloned data endpoint 420 is configured such that cloned data endpoint 420 generates a fault response in response to a data request. In other words, disabling cloned endpoint 420 results in a stub implementation that does not process data. This facilitates decoupling the runtime of data service 405 from the runtime of metadata service 415.

In operation 350 of FIG. 3, the location of metadata endpoint 421 is published. For example, an e-mail may be sent, or a directory can be created which conveys the location of metadata endpoint 421 to a developer working in the environment of second SOE 220. Thus, one embodiment of the present technology publishes the address of a metadata endpoint 421 which runs separately from the runtime endpoint (e.g., data endpoint 410).

Thus, one embodiment of the present technology creates a metadata endpoint for a generic service. In so doing, an application developer working within the environment of second SOE 220 now has access to a metadata endpoint in order to create an application which can communicate with data endpoint 410. When an endpoint of second SOE 220 sends a metadata exchange message (e.g., 450) to second metadata endpoint 421, metadata endpoint 421 initiates retrieving the requested data via metadata exporter 422. In one embodiment, metadata exporter 422 retrieves the contract data 430 which describes an operation performed by data endpoint 410 and how to invoke that operation. Metadata exporter also accesses the data endpoint configuration 411 and replaces the generic contract data from data endpoint configuration 411 with contract data 430. Metadata service 415 then generates a reply (e.g., 460) comprising the contract data 430 as well as data endpoint configuration 411. In one embodiment, reply 460 comprises a Web Services Description Language (WSDL) message. Thus, the metadata returned originates from one process (e.g., the process running metadata service 415) while the actual service is running from another process (e.g., the process running data service 405).

In one embodiment, metadata service 415 can be configured to provide the base address of data endpoint 410 in reply 460. In other words, metadata service 415 provides the address of data endpoint 410 in reply 460. Thus, subsequent requests for the operation performed by data service 405 will be directed to data endpoint 410. This configuration can be stored in, for example, the data endpoint configuration resident upon metadata exporter 422.

FIG. 5 is a flowchart of a method 500 for exchanging metadata in accordance with one embodiment of the present technology. In one embodiment, method 500 is implemented by metadata service 415 of FIG. 4. In operation 510 a request for metadata of a data endpoint operating on a first process is received. As described above, data endpoint 410 typically exposes a generic contract which may not convey enough information on how to invoke an operation performed by data service 405. Thus, while a developer operating in the environment of second SOE 220 is trying to create a program which can interact with data endpoint 410, the developer sends a request for a metadata exchange which is directed to metadata endpoint 421.

In operation 520 of FIG. 5, metadata corresponding to the data endpoint is retrieved from a metadata endpoint operating on a second process. As described above, metadata service 415 runs on a separate process than that upon which data endpoint 410 is running. In one embodiment, metadata exporter 422 of metadata service 415 initiates retrieval of metadata (e.g., contract data 430) corresponding to data endpoint 410 in response to a request for a metadata exchange. Contract data 430 comprises data describing an operation which can be invoked via data endpoint 410 and how to invoke that operation. Thus, while data endpoint 410 provides a generic contract for data service 405, contract data 430 provides information on how to invoke a specific operation of data endpoint 410. Metadata exporter 422 also retrieves the data endpoint configuration 411 it received via cloned data endpoint 420 to access the binding data which describes how to communicate with data endpoint 410. In one embodiment, metadata exporter 422 also accesses the generic contract exposed by data endpoint 410 from data endpoint configuration 411 and replaces the generic contract data with contract data 430 to create a fully typed response to metadata exchange request 450.

In operation 530, a reply is created which conveys the metadata the location of the data service. As described above, metadata service 415 generates a reply to the request for a metadata exchange which conveys metadata for data endpoint 410 (e.g., contract data 430) and the binding which describes how to communicate with data endpoint 410. Additionally, metadata service 415 can be configured to provide the base address of data endpoint 410 in response to the request for a metadata exchange. In so doing, the developer can create an application which directs requests invoking the operation performed by data service 405 to data endpoint 410. Because the location of metadata endpoint 421 is published when a service is exposed, messages invoking an operation performed by data service 405 would be incorrectly directed toward metadata endpoint 421. By configuring metadata service 415 to provide the base address of data endpoint 410 in reply 460, the application being created to interact with data endpoint 410 will have the correct address to which subsequent messages can be addressed which will invoke the operation performed by data service 405.

FIG. 6 is a flowchart of a computer-implemented method 600 for creating a metadata endpoint for a generic service in accordance with one embodiment of the present technology. In operation 610 of FIG. 6, an endpoint is defined for metadata which was previously combined with a corresponding data endpoint of a first Service Oriented Environment (SOE) in which a combining constraint is not placed upon metadata and corresponding data. As described above, first SOE 210 does not place a combining constraint upon metadata and corresponding data in one embodiment. In other words, first SOE 210 handles metadata and corresponding data separately. In other words, when metadata service 415 is created, metadata endpoint 421 is used as a point of access for metadata corresponding to the data service 405.

In operation 620 of FIG. 6, the location for accessing the endpoint for metadata is published for use by a second SOE in which a combining constraint is placed upon metadata and corresponding data. In one embodiment, the location of metadata endpoint 421 is published for use by second SOE 220. In so doing, a developer can access metadata corresponding to data service 405 via metadata endpoint 421. As described above, second SOE 220 operates with a combining constraint upon data and corresponding data in one embodiment.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for creating a metadata endpoint for a generic data service, said computer-implemented method comprising:
    creating an endpoint for metadata that describes how to communicate with a corresponding data endpoint of said data service in a first Service Oriented Environment (SOE), wherein said data endpoint is created by a process that hosts a runtime of said data service and wherein said endpoint for metadata is created by a different process than said process that hosts said runtime of said data service; and
    publishing a location for accessing said endpoint for metadata for use by a second SOE; wherein said creating said endpoint for said metadata comprises:
    creating a cloned data endpoint corresponding to said data endpoint by said different process;
    coupling said endpoint for metadata with said cloned data endpoint; and
    disabling said cloned data endpoint wherein said cloned data endpoint generates a fault response in response to a received message.

2. The method as recited in claim 1 further comprising:
    changing a configuration setting of said data endpoint;
    automatically changing a corresponding configuration setting of said cloned data endpoint; and
    automatically updating metadata within said endpoint for metadata corresponding to said configuration setting of said cloned data endpoint.

3. The method as recited in claim 1 further comprising:
    receiving a request for metadata;
    generating a response in response to said request for metadata which conveys metadata from said endpoint for metadata; and
    conveying the location of said data endpoint in said response.

4. The method as recited in claim 1 further comprising:
    disabling the data service of said data endpoint.

5. A computer-readable storage unit that stores instructions that, when executed, cause a computer system to perform a method for creating a metadata endpoint for a generic data service, said computer-implemented method comprising:
    creating an endpoint for metadata that describes how to communicate with a corresponding data endpoint of said data service in a first Service Oriented Environment (SOE), wherein said data endpoint is created by a process that hosts a runtime of said data service and wherein said endpoint for metadata is created by a different process than said process that hosts said runtime of said data service; and
    publishing a location for accessing said endpoint for metadata for use by a second SOE;
    wherein said creating said endpoint for said metadata comprises:
    creating a cloned data endpoint corresponding to said data endpoint by said different process;
    coupling said endpoint for metadata with said cloned data endpoint; and
    disabling said second data endpoint wherein said second data endpoint generates a fault response in response to a received message.

6. The computer-readable storage unit as recited in claim 5, wherein said computer-implemented method further comprises:
    changing a configuration setting of said data endpoint;
    automatically changing a corresponding configuration setting of said cloned data endpoint; and
    automatically updating metadata within said endpoint for metadata corresponding to said configuration setting of said cloned data endpoint.

7. The computer-readable storage unit as recited in claim 5, wherein said computer-implemented method further comprises:
    receiving a request for metadata;
    generating a response in response to said request for metadata which conveys metadata from said metadata endpoint; and
    conveying the location of said data endpoint in said response.

8. The computer-readable storage unit as recited in claim 5, wherein said computer-implemented method further comprises:
    disabling the data service of said data endpoint.

9. A computer implemented method for exchanging metadata, said method comprising:
    receiving a request for metadata of a data endpoint of a data service in a first Service Oriented Environment (SOE) operating on a first process that hosts a runtime of said data service;
    retrieving metadata that describes how to communicate with said data endpoint from a metadata endpoint operating on a second process; and
    creating a reply which conveys the metadata and the location of said data endpoint in said reply;
    wherein said metadata endpoint is created by creating a cloned data endpoint corresponding to said data endpoint by said second process, coupling said endpoint for metadata with said cloned data endpoint, and disabling said cloned data endpoint wherein said cloned data endpoint generates a fault response in response to a received message.

10. The method as recited in claim 9 further comprising:
publishing the location of said metadata endpoint for use by a second (SOE).

11. The method as recited in claim 9 further comprising:
changing a configuration setting of said data endpoint;
automatically changing a corresponding configuration setting of said cloned data endpoint; and
automatically updating metadata within said endpoint for metadata corresponding to said configuration setting of said data endpoint.

12. The method as recited in claim 9 further wherein said receiving further comprises:
receiving said request for metadata from a Service Oriented Environment (SOE) wherein a combining constraint is placed upon metadata and corresponding data.

13. The method as recited in claim 12 wherein creating said reply further comprises:
generating a response from a second SOE wherein a combining constraint is not placed upon metadata and corresponding data.

14. The method as recited in claim 3, wherein generating a response in response to said request for metadata which conveys metadata from said endpoint for metadata comprises:
obtaining by said different process contract data that describes at least one operation performed by said data service; and
including said contract data in said response.

15. The computer-readable storage unit as recited in claim 7, wherein said generating a response in response to said request for metadata which conveys metadata from said metadata endpoint comprises:
obtaining by said different process contract data that describes at least one operation performed by said data service; and
including said contract data in said response.

* * * * *